US012577474B2

(12) United States Patent
Yokoi et al.

(10) Patent No.: US 12,577,474 B2
(45) Date of Patent: Mar. 17, 2026

(54) PHOSPHORUS MODIFIED UZM-35, METHODS OF PREPARATION, AND METHODS OF USE THEREOF

(71) Applicant: BASF Corporation, Florham Park, NJ (US)

(72) Inventors: Toshiyuki Yokoi, Tokyo (JP); Bilge Yilmaz, Iselin, NJ (US); Chandrashekhar Kelkar, Iselin, NJ (US); Christopher John Gilbert, Iselin, NJ (US); David M. Stockwell, Iselin, NJ (US); Xingtao Gao, Iselin, NJ (US)

(73) Assignee: BASF Corporation, Florham Park, NJ (US)

( * ) Notice: Subject to any disclaimer, the term of this patent is extended or adjusted under 35 U.S.C. 154(b) by 168 days.

(21) Appl. No.: 18/278,577

(22) PCT Filed: Mar. 2, 2022

(86) PCT No.: PCT/US2022/018459
§ 371 (c)(1),
(2) Date: Aug. 23, 2023

(87) PCT Pub. No.: WO2022/187320
PCT Pub. Date: Sep. 9, 2022

(65) Prior Publication Data
US 2024/0132789 A1     Apr. 25, 2024
US 2024/0228893 A9     Jul. 11, 2024

Related U.S. Application Data

(60) Provisional application No. 63/155,428, filed on Mar. 2, 2021.

(51) Int. Cl.
*C10G 47/20*     (2006.01)
*B01J 29/08*     (2006.01)
(Continued)

(52) U.S. Cl.
CPC ............ *C10G 47/20* (2013.01); *B01J 29/084* (2013.01); *B01J 29/40* (2013.01); *B01J 29/70* (2013.01);
(Continued)

(58) Field of Classification Search
CPC .............................. C10G 47/20; C10G 47/30; C10G 2300/1037; C10G 11/05; C10G 2400/20;
(Continued)

(56) References Cited

U.S. PATENT DOCUMENTS 4,590,321 A      5/1986  Chu
8,071,831 B1 *  12/2011  Bogdan ................. C07C 5/2791
                                           585/481

(Continued)

FOREIGN PATENT DOCUMENTS

WO      WO-2011/005483 A2      1/2011
WO          2020/190367 A1      9/2020

OTHER PUBLICATIONS

European Search Report for EP Patent Application No. 22763947.3, Issued on Dec. 19, 2024, 3 pages.
(Continued)

*Primary Examiner* — Prem C Singh
*Assistant Examiner* — Francis C Campanell
(74) *Attorney, Agent, or Firm* — Peter DiMauro

(57)          ABSTRACT

Disclosed herein is a phosphorus modified UZM-35 zeolite, methods of its preparation, and methods of its use in hydrocarbon conversion processes, e.g., as part of a catalyst component and/or as part of a catalyst composition. Catalyst components with phosphorus modified UZM-35, their methods of preparation, and their methods of use suitable for petroleum refining applications (e.g., hydrocarbon conversion processes such as fluid catalytic cracking and hydrocracking) are described herein. Also disclosed herein are (Continued)

catalyst compositions, which include phosphorus modified UZM-35 and catalyst components thereof along with at least one additional catalyst component. Methods of preparing and methods of using such catalyst compositions are also encompassed by the instant disclosure.

19 Claims, 4 Drawing Sheets

(51) Int. Cl.

| | |
|---|---|
| *B01J 29/40* | (2006.01) |
| *B01J 29/70* | (2006.01) |
| *B01J 29/80* | (2006.01) |
| *B01J 37/28* | (2006.01) |
| *C01B 39/02* | (2006.01) |
| *C10G 47/30* | (2006.01) |

(52) U.S. Cl.
CPC ........... *B01J 29/7007* (2013.01); *B01J 29/80* (2013.01); *B01J 37/28* (2013.01); *C01B 39/026* (2013.01); *C10G 47/30* (2013.01); *B01J 2229/24* (2013.01); *B01J 2229/36* (2013.01); *B01J 2229/42* (2013.01); *C01P 2002/72* (2013.01); *C10G 2300/1037* (2013.01)

(58) Field of Classification Search
CPC .......... B01J 29/084; B01J 29/40; B01J 29/70; B01J 29/7007; B01J 29/80; B01J 37/28; B01J 2229/24; B01J 2229/36; B01J 2229/42; B01J 2235/15; C01B 39/026; C01P 2002/72; C07C 2529/70; C07C 4/06
USPC ...................................................... 208/111.15
See application file for complete search history.

(56) References Cited

U.S. PATENT DOCUMENTS

| | | | |
|---|---|---|---|
| 8,247,631 B2 | 8/2012 | Nicholas et al. | |
| 2009/0264693 A1 | 10/2009 | Xie et al. | |
| 2011/0178357 A1 | 7/2011 | Moscoso et al. | |
| 2013/0123557 A1* | 5/2013 | McCarthy | B01J 35/30 585/475 |
| 2013/0281753 A1* | 10/2013 | McCarthy | B01J 35/67 502/77 |
| 2017/0333882 A1* | 11/2017 | Kim | B01J 29/76 |
| 2021/0229085 A1 | 7/2021 | Matsukawa et al. | |

OTHER PUBLICATIONS

International Search Report and Written Opinion of International Application No. PCT/EP2022/018549 mailed Jul. 12, 2022, 7 pgs.

* cited by examiner

PHOSPHORUS MODIFIED UZM-35, METHODS OF PREPARATION, AND METHODS OF USE THEREOF

CROSS-REFERENCE TO RELATED APPLICATION(S)

This application claims the benefit of priority of U.S. Provisional Patent Application No. 63/155,428, filed on Mar. 2, 2021, the disclosure of which is hereby incorporated by reference herein in its entirety.

FIELD OF THE DISCLOSURE

The present disclosure relates to petroleum refining catalysts and compositions thereof. In particular, the present disclosure relates to a phosphorus modified UZM-35 zeolite, methods of its use for hydrocarbon conversion processes, such as fluid catalytic cracking (FCC) applications, and methods of its preparation.

BACKGROUND OF THE DISCLOSURE

FCC is the main source of world's butylenes production. Almost half of the butylenes production is sourced from FCC units, and more than 40% of it is consumed to make high octane blending components via alkylation units. Due to increasing demand for improved fuel efficiency, more and more refiners find it profitable to increase butylenes in their units. However, conventional olefin maximization additives based on ZSM-5 alone are not sufficient to meet this target. ZSM-5 additives are designed to make propylene; thus, they make more propylene over butylenes. When the units are wet-gas compressor limited the use of ZSM-5 will increase propylene more than butylenes, thus reaching the liquefied petroleum gas (LPG) limit constraints before reaching the required butylenes yields. In such a scenario the unit needs a catalyst (or additive) solution which contributes to increased butylenes/propylene (C4=/C3=) ratio compared to ZSM-5. Identifying materials with adjusted selectivity toward specific small olefins (e.g., butylenes) in a controlled and deliberate manner is of interest in petroleum refining applications (e.g., fluid catalytic cracking, hydrocracking).

SUMMARY OF THE DISCLOSURE

In certain embodiments, the present disclosure contemplates a zeolite including a phosphorus modified UZM-35 zeolite. In embodiments, the phosphorus modified UZM-35 includes from about 0.5 wt % to about 10 wt %, about 1 wt % to about 5 wt %, about 1 wt % to about 3 wt %, or from about 2 wt % to about 4 wt % phosphorus, based on the total weight of the zeolite.

In certain embodiments, the present disclosure provides a catalyst component that includes a zeolite having a UZM-35 zeolite that has been phosphorus modified with about 0.5 wt % to about 10 wt % phosphorus, based on the total weight of the zeolite, and a non-zeolitic matrix. Any of the phosphorus modified UZM-35 zeolites contemplated herein may be included in the catalyst component.

In certain embodiments, the phosphorus content in the catalyst component ranges from about 1 wt % to about 5 wt %, about 1 wt % to about 3 wt %, or from about 2 wt % to about 4 wt %, based on total weight of the zeolite.

In certain embodiments, the non-zeolitic matrix includes one or more of clay, spinel, mullite, boehmite, alumina, silica, titania, zirconia, magnesia, kaolin, metakaolin, halloysite, kaolinite, dickite, nacrite, anauxite, silica-alumina, silica-magnesia, silica-zirconia, silica-thoria, silica-beryllia, silica-titania, silica-alumina-thoria, silica-alumina-zirconia, silica-alumina-magnesia, silica-magnesia-zirconia, rare earth-doped alumina (e.g., selected from one or more of ytterbium-doped alumina, gadolinium-doped alumina, cerium-doped alumina, or lanthanum-doped alumina), silica-doped alumina, gamma-alumina, $\alpha$-alumina, $\chi$-alumina, $\delta$-alumina, $\theta$-alumina, $\kappa$-alumina, or a mixture thereof.

In certain embodiments, the phosphorus modified UZM-35 zeolite is present in the catalyst component in an amount of about 1 wt % to about 90 wt %, about 2 wt % to about 80 wt %, or about 5 wt % to about 60 wt %, based on total weight of the catalyst component.

In certain embodiments, the catalyst component has an total acidity of about 0.3 mmol/(g catalyst component) to about 0.5 mmol/(g catalyst component).

In certain embodiments, the phosphorus modified UZM-35 zeolite has a silicon to aluminum ratio (SAR) ranging from about 5 to about 60, from about 7 to about 30, or from about 9 to about 15.

In certain embodiments, the BET total specific surface area of the catalyst component, before steaming, ranges from about 150 m²/g to about 750 m²/g, from about 175 m²/g to about 675 m²/g, from about 200 m²/g to about 600 m²/g, or about 200 m²/g to about 400 m²/g. In certain embodiments, the BET total specific surface area of the catalyst component, after steaming, ranges from about 75 m²/g to about 500 m²/g, from about 100 m²/g to about 350 m²/g, from about 125 m²/g to about 250 m²/g, or about 140 m²/g to about 180 m²/g.

In certain embodiments, the t-plot micropore volume of the catalyst component, before steaming, ranges from about 0.05 cc/g to about 0.3 cc/g, from about 0.06 cc/g to about 0.23 cc/g, or from about 0.07 cc/g to about 0.16 cc/g. In certain embodiments, the t-plot micropore volume of the catalyst component, after steaming, ranges from about 0.03 cc/g to about 0.3 cc/g, from about 0.04 cc/g to about 0.2 cc/g, or from about 0.05 cc/g to about 0.1 cc/g.

In certain embodiments, the phosphorus modified UZM-35 zeolite (and the catalyst component including said zeolite) has a first X-Ray Diffraction (XRD) pattern, which is substantially similar, in terms of peaks locations and relative intensity, to a second XRD pattern of that zeolite without phosphorus modification (e.g., UZM-35 zeolite without phosphorus modification and/or a catalyst component with a UZM-35 zeolite without phosphorus modification).

In certain embodiments, the present disclosure provides a catalyst composition for petroleum refining applications (e.g., hydrocarbon conversion processes such as fluid catalytic cracking (FCC) and/or hydrocracking) that includes a first component and a second component.

In certain embodiments, the first component includes a UZM-35 zeolite that has been phosphate modified/stabilized with about 0.5 wt % to about 10 wt % phosphorus, based on the total weight of the zeolite in the first component, and a non-zeolitic matrix. In certain embodiments, the first component includes any of the phosphorus modified UZM-35 zeolites described herein and a non-zeolitic matrix.

In certain embodiments, the second component in the catalyst compositions contemplated herein is compositionally different from the first component. In certain embodiments, the second component includes a second non-zeolitic matrix and one or more zeolites (e.g., ZSM-5, zeolite Y, beta zeolite, and more). In certain embodiments, the catalyst composition may include at least one additional catalyst component that is compositionally different from the first component and from the second component (e.g., ZSM-5, zeolite Y, beta zeolite, and more).

In certain embodiments, the first catalyst component is present in the catalyst composition in an amount ranging from about 1 wt % to about 25 wt %, from about 1.5 wt % to about 15 wt %, or from about 2 wt % to about 10 wt %, based on total weight of the catalyst composition.

In certain embodiments, the second catalyst component and any additional catalyst component if included, are present in the catalyst composition (cumulatively) in an amount ranging from about 75 wt % to about 99 wt %, from about 85 wt % to about 98.5 wt %, or from about 90 wt % to about 98 wt %, based on total weight of the catalyst composition.

In certain embodiments, the instant disclosure is directed to a process for preparing any of the phosphorus modified UZM-35 zeolites described herein, which includes stabilizing (e.g., modifying by impregnation for example) the UZM-35 zeolite with a phosphorus containing compound, such as, without limitations, phosphoric acid, diammonium phosphorus, or a combination thereof.

In certain embodiments, the instant disclosure is directed to a process for preparing any of the catalyst components described herein, which include a phosphate stabilized UZM-35 and a non-zeolitic matrix. In certain embodiments, the process includes stabilizing (e.g., modifying by impregnation for example) the UZM-35 zeolite with a phosphorus containing compound, such as, without limitations, phosphoric acid, diammonium phosphorus, or a combination thereof. In certain embodiments, the process may further include calcining the phosphorus modified UZM-35 zeolite. In certain embodiments, the process further includes combining the phosphorus modified UZM-35 zeolite with a non-zeolitic matrix (e.g., via in-situ crystallization and/or via incorporation).

In certain embodiments, the instant disclosure is directed to a process for preparing any of the catalyst compositions described herein by combining any of the catalyst components described herein (referred to as first catalyst component), which include a phosphorus modified UZM-35 zeolite, with a second catalyst component (compositionally different from the first catalyst component), and optionally with at least one additional catalyst component (compositionally different from the first catalyst component and from the second catalyst component).

The catalyst compositions described herein include multiple zeolitic frameworks to exhibit superior catalytic performance in various hydrocarbon conversion processes. For example, the catalyst compositions described herein deliver, in certain embodiments, e.g., related to fluid catalytic cracking processes, superior butylenes activity, butylenes yield, and butylenes selectivity, while maintaining constant or lower yields and selectivity for less desired products, such as hydrogen, coke, higher hydrocarbons (such as C6 and C7), and lower hydrocarbons (such as C2). The catalyst components described herein, which include a phosphorus modified UZM-35 zeolite and a non-zeolitic matrix, also deliver similar superior catalytic performance.

In certain embodiments, the phosphorus modified UZM-35 zeolites described herein and/or the catalyst components (which include the phosphorus modified UZM-35 zeolites described herein and a non-zeolitic matrix), and/or the catalyst compositions described herein may be utilized in various hydrocarbon conversion processes by contacting a hydrocarbon feedstock with any of said zeolites and/or catalyst components and/or catalyst compositions. Non-limiting examples of hydrocarbon conversion processes contemplated herein include one or more of catalytic cracking, hydrocracking, alkylation of aromatic and/or isoparaffin, isomerization of paraffin and poly-alkylbenzenes, transalkylation of poly-alkylbenzene with benzene or mono-alkylbenzenes, disproportionation of mono-alkylbenzenes, polymerization, reforming, hydrogenation, dehydrogenation, transalkylation, dealkylation, hydration, dehydration, hydrotreating, hydrodenitrogenation, hydrodesulfurization, methanation, syngas shift process, hydrorefining, or a combination thereof.

In certain embodiments, the instant disclosure is directed to a process for catalytic cracking of a hydrocarbon feedstock by contacting the feedstock with any of the phosphorus modified UZM-35 zeolites described herein and/or any of the catalyst components described herein (which include the phosphorus modified UZM-35 zeolites described herein and a non-zeolitic matrix) and/or any of the catalyst compositions described herein.

In certain embodiments, a first butylenes to propylene selectivity ratio, attained from contacting the feedstock with any of the catalyst components described herein, which include a phosphorus modified UZM-35 zeolite and a non-zeolitic matrix, is greater than a second butylenes to propylene selectivity ratio, attained from contacting the feedstock with a catalyst component with UZM-35 without phosphorus.

In certain embodiments, the zeolite structure and activity may be evidenced by one or more of the following properties: zeolite surface area (ZSA), total surface area (TSA), steamed zeolite surface area (sZSA), total acidity, pore volume, TC4=(Total butylenes) yield, butylenes to propylene selectivity ratio, and the like. These values should be viewed as target achievable values and not inherent to the catalyst components or catalyst compositions described herein.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DEFINITIONS

Figure 1A:
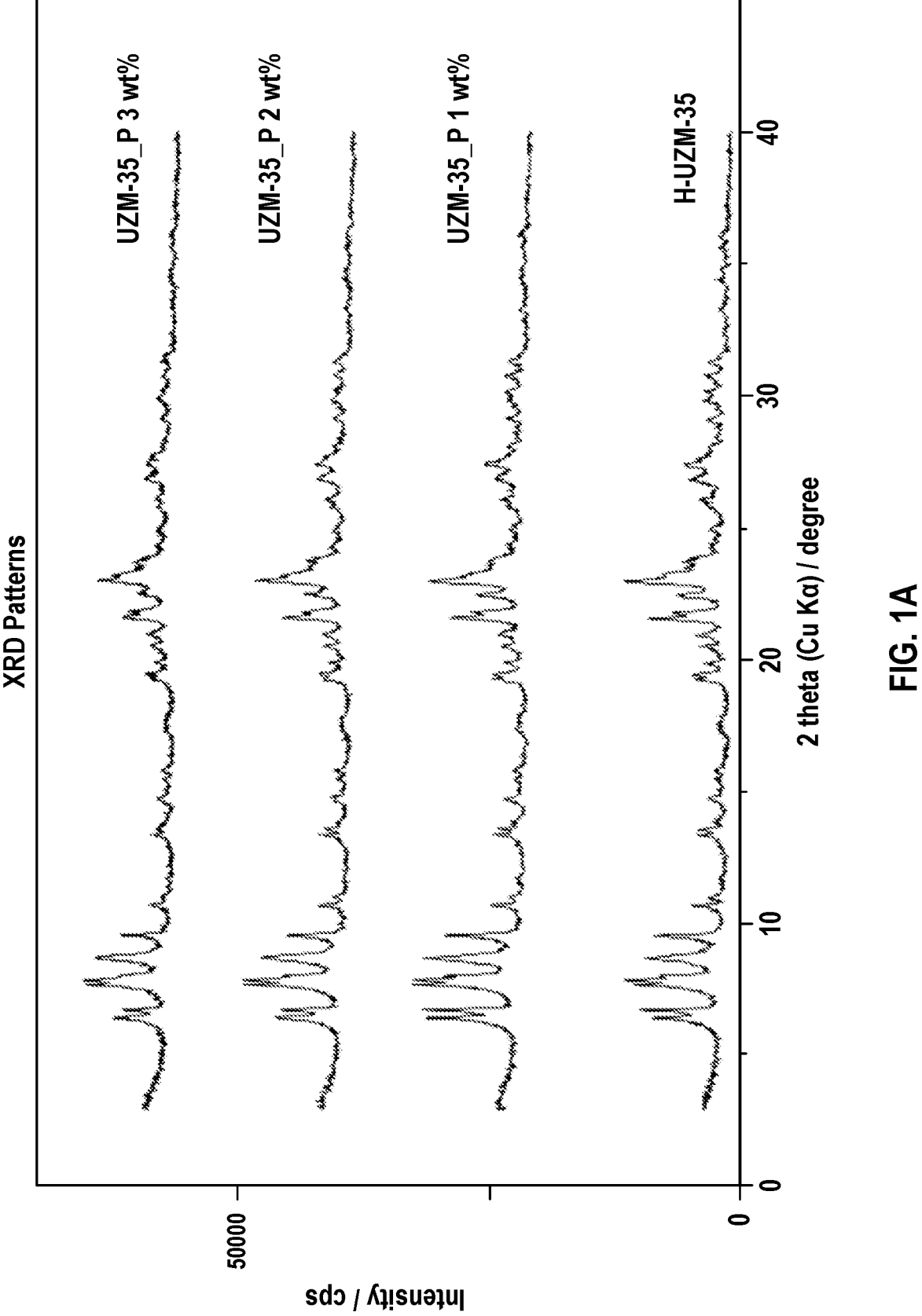
FIG. 1A illustrates the X-Ray Diffraction (XRD) patterns of various catalyst components including UZM-35 zeolite prior to steaming and with various amounts of phosphorus modification.

As used herein, the singular forms "a," "an," and "the" include plural references unless the context clearly indicates otherwise. Thus, for example, reference to "a component" includes a single component as well as a mixture of two or more similar or different components, and the like.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number±10%, such that "about 10" would include from 9 to 11.

As used herein, the term "catalyst" or "catalyst composition" or "catalyst material" refers to a material that promotes a reaction. As used herein, the term "composition," when referring to a catalyst composition or an additive composition, refers to a blend or a mixture of two or more separate and distinct components, such as a first component mixed or blended with a second component. In certain embodiments, the components in the composition are chemically combined and cannot be separated through physical means (e.g., filtration). In other embodiments, the components in the composition are not chemically combined and may be separated through physical means (e.g., filtration).

As used herein, the term "fluid catalytic cracking" or "FCC" refers to a conversion process in petroleum refineries wherein high-boiling, high-molecular weight hydrocarbon fractions of petroleum crude oils are converted to more valuable gasoline, olefinic gases, and other products.

"Cracking conditions" or "FCC conditions" refers to typical FCC process conditions. Typical FCC processes are conducted at reaction temperatures of 450° to 650° C. with catalyst regeneration temperatures of 600° to 850° C. Hot regenerated catalyst is added to a hydrocarbon feed at the base of a rise reactor. The fluidization of the solid catalyst particles may be promoted with a lift gas. The catalyst vaporizes and superheats the feed to the desired cracking temperature. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products are fractionated into a series of products, including gas, gasoline, light gas oil, and heavy cycle gas oil. Some heavier hydrocarbons may be recycled to the reactor.

As used herein, the term "feed" or "feedstock" refers to that portion of crude oil that has a high boiling point and a high molecular weight. In FCC processes, a hydrocarbon feedstock is injected into the riser section of an FCC unit, where the feedstock is cracked into lighter, more valuable products upon contacting hot catalyst circulated to the riser-reactor from a catalyst regenerator.

As used herein, "particles" can be in the form of microspheres which can be obtained by spray drying. As is understood by skilled artisans, microspheres are not necessarily perfectly spherical in shape.

As used herein, the terms "non-zeolitic component" or "matrix" or "non-zeolitic matrix" refer to the components of an FCC catalyst that are not zeolites or molecular sieves. As used herein, the non-zeolitic component can comprise binder and filler.

As used herein, the term "zeolite" refers to is a crystalline aluminosilicate with a framework based on an extensive three-dimensional network of silicon, aluminum and oxygen ions and have a substantially uniform pore distribution.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate certain materials and methods and does not pose a limitation on scope. No language in the specification should be construed as indicating any non-claimed element as essential to the practice of the disclosed materials and methods.

DETAILED DESCRIPTION

This disclosure is directed in certain embodiments to a phosphorus modified UZM-35 zeolite, a catalyst component that includes a phosphorus modified UZM-35 zeolite, a catalyst composition in which a catalyst component with a phosphorus modified UZM-35 is included as an additive, methods of preparation thereof, and methods of use thereof.

The above-referenced zeolite, catalyst component (which in certain instances may be referred to as a first catalyst component), catalyst composition, methods of their preparation, and methods of their use will be described.

Phosphorus Modified UZM-35 and First Catalyst Component

In certain embodiments, the instant disclosure encompasses a phosphorus modified UZM-35 zeolite.

In certain embodiments, the instant disclosure encompasses a first catalyst component that includes a UZM-35 zeolite that has been phosphorus modified, and a first non zeolitic matrix. Any of the phosphorus modified UZM-35 zeolites described herein may be part of the first catalyst components contemplated herein.

In certain embodiments, the phosphorus modified UZM-35 zeolite has a first XRD pattern that is substantially similar, in terms of peak locations and intensities, to a second XRD pattern of the same zeolite without phosphorus modification (e.g., XRD of UZM-35_P 1/2/3 wt % as compared to XRD of H-UZM-35 in FIG. 1A). In certain embodiments, the phosphorus modified UZM-35 zeolite, after steaming, has an XRD pattern that is substantially similar, in terms of peak locations and intensities, to an XRD pattern of the same zeolite without phosphorus modification, after steaming and/or before steaming (e.g., XRD of UZM-35 P 1/2/3 wt %-ST as compared to XRD of UZM-35-ST and/or as compared to the XRD of H-UZM-35 in FIG. 1B). In certain embodiments, the UZM-35 zeolite maintains a MSE zeolite structure after phosphorus modification and/or after steaming.

In certain embodiments, the silicon to aluminum ratio (SAR) of the phosphorus modified UZM-35 zeolite ranges from any of about 5, about 6, about 7, about 8, about 9, about 10, about 11, about 12, about 13, or about 14 to any of about 15, about 20, about 25, about 30, about 35, about 40, about 45, about 50, about 55, or about 60, or any sub-range or single SAR value therein. In one embodiment, the SAR of any of the phosphorus modified UZM-35 zeolites contemplated herein ranges from about 5 to about 60. In one embodiment, the SAR of any of the phosphorus modified UZM-35 zeolites contemplated herein ranges from about 7 to about 30. In one embodiment, the SAR of any of the phosphorus modified UZM-35 zeolites contemplated herein ranges from about 9 to about 15. In one embodiment, the SAR of any of the phosphorus modified UZM-35 zeolites contemplated herein ranges from about 5 to about 10. Without being construed as limiting, it is believed that the SAR can be an important parameter which affects zeolite stability and activity. The SAR value should balance between maintaining the stability of the zeolite structure and the butylenes activity of the catalyst component that the zeolite is included in.

The phosphorus content in the first catalyst component and/or in the phosphorus modified UZM-35 zeolites contemplated herein may range from any of about 0.5 wt %, about 1 wt %, about 1.5 wt %, about 2 wt %, about 2.5 wt %, about 3 wt %, or about 3.5 wt % to any of about 4 wt %, about 5 wt %, about 6 wt %, about 7 wt %, about 8 wt %, about 9 wt %, or about 10 wt %, or any sub-range or single phosphorus concentration value therein, based on the total weight of the zeolite. In one embodiment, the phosphorus content ranges from about 0.5 wt % to about 10 wt %, based on the total weight of the zeolite. In one embodiment, the phosphorus content ranges from about 1 wt % to about 5 wt %, based on the total weight of the zeolite. In one embodiment, the phosphorus content ranges from about 2 wt % to about 4 wt %, based on the total weight of the zeolite. In one embodiment, the phosphorus content ranges from about 1 wt % to about 3 wt %, based on the total weight of the zeolite. In one embodiment, the phosphorus content is about 1 wt %, based on the total weight of the zeolite. In one embodiment, the phosphorus content is about 2 wt %, based on the total weight of the zeolite. In one embodiment, the phosphorus content is about 3 wt %, based on the total weight of the zeolite.

In certain embodiments, the phosphorus to aluminum (P/Al) molar ratio in the first catalyst component and/or in the phosphorus modified UZM-35 zeolites contemplated herein (whether before or after steaming) may range from any of about 0.05, about 0.06, about 0.07, about 0.08, about 0.09, about 0.10, about 0.11, about 0.12, about 0.13, about 0.14, or about 0.15 to any of about 0.16, about 0.18, about 0.20, about 0.22, about 0.25, about 0.28, about 0.30, about 0.33, about 0.35, about 0.38, about 0.40, about 0.43, about 0.45, about 0.48, about 0.50, about 0.53, about 0.55, about 0.60, about 0.70, about 0.80, about 0.90, or about 1.0, or any sub-range or single P/Al molar ratio value therein. In one embodiment, the P/Al molar ratio ranges from about 0.05 to about 1.0. In one embodiment, the P/Al molar ratio ranges from about 0.10 to about 0.6. In one embodiment, the P/Al molar ratio ranges from about 0.20 to about 0.55.

The first catalyst component may include any of the phosphorus modified UZM-35 zeolites described herein in an amount ranging from any of about 1 wt %, about 2 wt %, about 3 wt %, about 4 wt %, about 5 wt %, about 6 wt %, about 7 wt %, about 8 wt %, about 9 wt %, about 10 wt %, about 15 wt %, about 20 wt %, about 25 wt %, about 30 wt %, or about 35 wt % to any of about 40 wt %, about 45 wt %, about 50 wt %, about 55 wt %, about 60 wt %, about 65 wt %, about 70 wt %, about 75 wt %, about 80 wt %, about 85 wt %, or about 90 wt %, or any sub-range or single concentration value therein, based on total weight of the first catalyst component. The remainder may be a first non-zeolitic matrix and/or one or more additional zeolites.

The first non-zeolitic matrix may include one or more of clay, spinel, mullite, boehmite, alumina, silica, titania, zirconia, magnesia, kaolin, metakaolin, halloysite, kaolinite, dickite, nacrite, anauxite, silica-alumina, silica-magnesia, silica-zirconia, silica-thoria, silica-beryllia, silica-titania, silica-alumina-thoria, silica-alumina-zirconia, silica-alumina-magnesia, silica-magnesia-zirconia, rare earth-doped alumina (e.g., selected from one or more of ytterbium-doped alumina, gadolinium-doped alumina, cerium-doped alumina, or lanthanum-doped alumina), silica-doped alumina, gamma-alumina, $\alpha$-alumina, $\chi$-alumina, $\delta$-alumina, $\theta$-alumina, $\kappa$-alumina, or a mixture thereof.

The one or more additional zeolites may include zeolites with the structure BEA (e.g., beta zeolite), MSE (e.g., MCM-68), -SVR, FAU (e.g., zeolite Y), MOR, CON, SOF, MFI (e.g., ZSM-5), IMF, FER, MWW, MTT, TON, EUO, MRE, NAT, CHA, TUN, YFI, or a combination thereof. In certain embodiments, the one or more additional zeolites may include, without limitations, (1) large pore zeolites (e.g., those having pore openings greater than about 7 Angstroms) such as, for example, USY, REY, silicoaluminophosphates SAPO-5, SAPO-37, SAPO-40, MCM-9, metal-loaluminophosphate MAPO-36, aluminophosphate VPI-5, or mesoporous crystalline material MCM-41; REUSY, zeolite X, zeolite Y, de-aluminated zeolite Y, silica-enriched de-aluminated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, UZM-35, ZSM-11, ZSM-11 intermediates, ZSM-12, ZSM-22, ZSM-23, ZSM-35, ZSM-38, ZSM-48, ZSM-57 silicoaluminophosphate SAPO-31 and (3) small pore zeolites (e.g., those having pore openings of less than about 4 Angstroms) such as, for example, erionite and ZSM-34. In certain embodiments, the one or more additional zeolites may include, without limitations, zeolite A, zeolite B, zeolite F, zeolite H, zeolite $\kappa$-G, zeolite L, zeolite M, zeolite Q, zeolite R, zeolite T, mordenite, erionite, offretite, ferrierite, chabazite, clinoptilolite, gmelinite, phillipsite and faujasite.

In certain embodiments, the BET total surface area (TSA) of the first catalyst component, prior to steaming and/or after steaming, ranges from any of about 75 m$^2$/g, about 100 m$^2$/g, about 125 m$^2$/g, about 140 m$^2$/g, about 150 m$^2$/g, about 175 m$^2$/g, about 180 m$^2$/g, about 200 m$^2$/g, about 225 m$^2$/g, about 250 m$^2$/g, about 275 m$^2$/g, about 300 m$^2$/g, about 325 m$^2$/g, about 350 m$^2$/g, about 375 m$^2$/g, or about 400 m$^2$/g to any of about 425 m$^2$/g, about 450 m$^2$/g, about 475 m$^2$/g, about 500 m$^2$/g, about 525 m$^2$/g, about 550 m$^2$/g, about 575 m$^2$/g, about 600 m$^2$/g, about 625 m$^2$/g, about 650 m$^2$/g, about 675 m$^2$/g, about 700 m$^2$/g, about 725 m$^2$/g, or about 750 m$^2$/g, or any sub-range or single surface area value therein. In one embodiment, the BET total surface area of the first catalyst component, prior to steaming and/or after steaming, ranges from about 150 m$^2$/g to about 750 m$^2$/g. In one embodiment, the BET total surface area of the first catalyst component, prior to steaming and/or after steaming, ranges from about 175 m$^2$/g to about 675 m$^2$/g. In one embodiment, the BET total surface area of the first catalyst component, prior to steaming and/or after steaming, ranges from about 200 m$^2$/g to about 600 m$^2$/g. In one embodiment, the BET total surface area of the first catalyst component, prior to steaming and/or after steaming, ranges from about 200 m$^2$/g to about 400 m$^2$/g. In one embodiment, the BET total surface area of the first catalyst component, prior to steaming and/or after steaming, ranges from about 225 m$^2$/g to about 400 m$^2$/g. In one embodiment, the BET total surface area of the first catalyst component, prior to steaming and/or after steaming, ranges from about 75 m$^2$/g to about 500 m$^2$/g. In one embodiment, the BET total surface area of the first catalyst component, prior to steaming and/or after steaming, ranges from about 100 m$^2$/g to about 350 m$^2$/g. In one embodiment, the BET total surface area of the first catalyst component, prior to steaming and/or after steaming, ranges from about 125 m$^2$/g to about 250 m$^2$/g. In one embodiment, the BET total surface area of the first catalyst component, prior to steaming and/or after steaming, ranges from about 140 m$^2$/g to about 180 m$^2$/g. Without being construed as limiting, it is believed that, in certain embodiments as pertains to fluid catalytic cracking processes, the butylenes activity (quantified as amount of butylenes per dose of the first catalyst component that is generated upon contacting at least the first catalyst component with a hydrocarbon feed), increases with increased zeolite surface area (ZSA) (or increased TSA) and/or with increased steamed zeolite surface area (SZSA) (or steamed TSA).

In certain embodiments, the first catalyst component has t-plot micropore volume, before steaming and/or after steaming, ranging from any of about 0.05 cc/g, about 0.06 cc/g, about 0.07 cc/g, about 0.08 cc/g, about 0.09 cc/g, about 0.10 cc/g, about 0.11 cc/g, about 0.12 cc/g, about 0.13 cc/g, about 0.14 cc/g, or about 0.15 cc/g to any of about 0.16 cc/g, about 0.17 cc/g, about 0.18 cc/g, about 0.19 cc/g, about 0.20 cc/g, about 0.21 cc/g, about 0.22 cc/g, about 0.23 cc/g, about 0.24 cc/g, about 0.25 cc/g, about 0.26 cc/g, about 0.27 cc/g, about 0.28 cc/g, about 0.29 cc/g, or about 0.30 cc/g, or any sub-range or single micropore volume value therein. In one embodiment, the first catalyst component has a t-plot micropore volume, before steaming and/or after steaming, ranging from about 0.03 cc/g to about 0.30 cc/g. In one embodiment, the first catalyst component has a t-plot micropore volume, before steaming and/or after steaming, ranging from about 0.05 cc/g to about 0.30 cc/g. In one embodiment, the first catalyst component has a t-plot micropore volume, before steaming and/or after steaming, ranging from about 0.06 cc/g to about 0.23 cc/g. In one embodiment, the first catalyst component has a t-plot micropore volume, before steaming and/or after steaming, ranging from about 0.04 cc/g to about 0.20 cc/g. In one embodiment, the first catalyst component has a t-plot micropore volume, before steaming and/or after steaming, ranging from about 0.07 cc/g to about 0.16 cc/g. In one embodiment, the first catalyst component has a t-plot micropore volume, before steaming and/or after steaming, ranging from about 0.05 cc/g to about 0.10 cc/g. Without being construed as limiting, it is believed that, in certain embodiments as pertains to fluid catalytic cracking processes, the micropore volume of the first catalyst component may be an important contributor to the butylenes related activity of the first catalyst component.

In certain embodiments, the first catalyst component has a total acidity (e.g., total number of acid sites), before steaming, ranging from about 0.1 mmol/(g catalyst) to about 0.7 mmol/(g catalyst), from about 0.2 mmol/(g catalyst) to about 0.7 mmol/(g catalyst), from about 0.3 mmol/(g catalyst) to about 0.7 mmol/(g catalyst), from about 0.1 mmol/(g catalyst) to about 0.6 mmol/(g catalyst), from about 0.2 mmol/(g catalyst) to about 0.6 mmol/(g catalyst), from about 0.3 mmol/(g catalyst) to about 0.6 mmol/(g catalyst), from about 0.1 mmol/(g catalyst) to about 0.5 mmol/(g catalyst), from about 0.2 mmol/(g catalyst) to about 0.5 mmol/(g catalyst), or from about 0.3 mmol/(g catalyst) to about 0.5 mmol/(g catalyst), or any sub-range or single total acidity value therein. In certain embodiments, the first catalyst component has a total acidity (e.g., total number of acid sites), after steaming, ranging from about 0.01 mmol/(g catalyst) to about 0.2 mmol/(g catalyst), from about 0.02 mmol/(g catalyst) to about 0.2 mmol/(g catalyst), from about 0.03 mmol/(g catalyst) to about 0.2 mmol/(g catalyst), from about 0.01 mmol/(g catalyst) to about 0.15 mmol/(g catalyst), from about 0.02 mmol/(g catalyst) to about 0.15 mmol/(g catalyst), from about 0.03 mmol/(g catalyst) to about 0.15 mmol/(g catalyst), from about 0.01 mmol/(g catalyst) to about 0.2 mmol/(g catalyst), from about 0.02 mmol/(g catalyst) to about 0.2 mmol/(g catalyst), or from about 0.03 mmol/(g catalyst) to about 0.2 mmol/(g catalyst), or any sub-range or single total acidity value therein. Without being construed as limiting, it is believed that, in certain embodiments as pertains to fluid catalytic cracking processes, the total acidity of the first catalyst component may be, in certain instances, a reflection of the butylenes related activity of the first catalyst component. The total acidity, which provides information about the total number of acid sites in the tested catalyst component, is measured by NH$_3$ temperature programmed desorption.

Preparation of the phosphorus modified UZM-35 and/or the first catalyst component, in accordance with certain embodiments of this disclosure follow, at least in part, the synthesis described in J. H. Lee et al., Applied Catalysis B: Environmental 200 (2017) 428-438, and U.S. Pat. No. 7,922,997, the teachings of which are incorporated by reference in their entirety and further detailed, at least in part, below.

In certain embodiments, the phosphorus modified UZM-35 is prepared by preparing an aluminosilicate solution by mixing a Si source with a solution of Al source and dimethyldipropylammonium hydroxide (DMDPAOH) in water.

In embodiments, the Al source is one or more of aluminum hydroxide (Al(OH)$_3$), aluminum isopropoxide (Al[OCH(CH$_3$)$_2$]$_3$), aluminum metal, pseudoboehmite, aluminum nitrate (Al(NO$_3$)$_3$·9H$_2$O). In one embodiment, the Al source is aluminum hydroxide (Al(OH)$_3$).

In embodiments, the Si source is one or more of colloidal silica, fumed silica, and tetraethylorthosilicate. In one embodiment, the Si source is colloidal silica.

In certain embodiments, an aqueous solution of KOH and NaOH is added to the aluminosilicate solution to form a final composition was 4.5DMDPAOH/x K$_2$O/(1−x) Na$_2$O/y Al$_2$O$_3$/10 SiO$_2$/150 H$_2$O, where x and y are varied between 0≤x≤1 and 0≤y≤1, respectively. In one embodiment, the final composition was 18 DMDPAOH/3 K$_2$O/1 Na$_2$O/2.4 Al$_2$O$_3$/40 SiO$_2$/600 H$_2$O.

In certain embodiments, the mixture may be stirred at room temperature for a first duration. The initial stirring may be performed at room temperature for about 10 minutes to about 360 minutes, about 30 minutes to about 180 minutes, about 60 minutes to about 150 minutes, or about 120 minutes. The amount of silicon source and aluminum source added may be adjusted to attain a target SAR. The type of silicon source, aluminum source, or base should not be construed as limiting. Other suitable silicon sources, aluminum sources, or bases, may be used, as can be readily identified by those skilled in the art.

After being stirred at room temperature for the initial duration, the synthesis mixture (of Al source, Si source, DMDPAOH, KOH, and NaOH), may be heated to a synthesis temperature and held at said synthesis temperature for a second duration under static conditions. In embodiments, the synthesis temperature may from about 100° C. to about 300° C., from about 120° C. to about 250° C., or from about 140° C. to about 200° C. The second duration may range from about 1 day to about 30 days, from about 3 days to about 20 days, from about 5 days to about 15 days, from about 6 days to about 14 days, or from about 7 days to about 14 days.

In certain embodiments, once synthesis of the UZM-35 zeolite and the crystallization process has been completed, the slurry may be filtered to separate the UZM-35 zeolite microspheres from a substantial portion of its mother liquor. The microspheres may be washed, e.g., by contacting them with water either during or after filtration. The purpose of the washing step is to remove mother liquor that would otherwise be left entrained within the microspheres. Subsequently, the microspheres may be dried. Drying may occur at a temperature ranging from about 40° C. to about 250° C., from about 80° C. to about 200° C., or from about 100° C. to about 140° C. The drying duration may range from about 2 hours to about 72 hours, from about 5 hours to about 24 hours, or from about 8 hours to about 15 hours.

The process for preparing the phosphorus modified UZM-35 and/or the first catalyst component may further include modifying or stabilizing the synthesized UZM-35 zeolite with phosphorus. Modifying or stabilizing may, in certain embodiments, include impregnating the synthesized UZM-35 zeolite with phosphorus. The impregnation may be through incipient wetness impregnation with a phosphorus source. Suitable phosphorus sources may include, without limitations, phosphoric acid, di-ammonium phosphate, or a combination thereof. In certain embodiments, other methods for modifying or stabilizing the MSE structured zeolite (e.g., UZM-35) with phosphorus may be utilized. The amount of phosphorus source utilized may be adjusted to achieve a target phosphorus content in the first catalyst component.

The phosphorus modified UZM-35 zeolite may be dried (in addition to the previous drying step or instead of the previous drying step described prior to the phosphorus modification/stabilization). In certain embodiments, drying of the phosphorus modified UZM-35 may occur at a temperature ranging from about 40° C. to about 250° C., from about 80° C. to about 200° C., or from about 100° C. to about 140° C. The drying duration of the phosphorus modified MSE zeolite may range from about 2 hours to about 72 hours, from about 5 hours to about 24 hours, or from about 8 hours to about 15 hours.

The process for preparing the first catalyst component may further include calcining the phosphorus modified UZM-35 zeolite, e.g., in a muffle furnace. The calcination duration may range from about 30 minutes to about 10 hours, from about 1 hours to about 8 hours, or from about 2 hours to about 4 hours. The calcination temperature may range from about 400° C. to about 800° C., from about 500° C. to about 750° C., or from about 600° C. to about 700° C. The calcination temperature and duration should not be construed as limiting. Under various circumstances, other calcination durations and temperatures may be utilized.

In certain embodiments, the process for preparing any of the first catalyst components described herein further includes combining any of the phosphorus modified UZM-35 zeolites described herein with any of the (first) non-zeolitic matrix materials described herein. The combining may be achieved via in-situ crystallization or via incorporating.

The process described here for preparing the phosphorus modified UZM-35 and/or the first catalyst component should not be construed as limiting. In certain embodiments, one or more drying steps may be implemented at various parts of the process, one or more calcination steps may be implemented at various parts of the process, one or more phosphorus stabilization/modification steps may be implemented at various parts of the process, and the like. Similarly, the order of steps should not be construed as limiting and it should be understood that phosphorus stabilization/modification and/or drying and/or calcination (and optionally other steps) may be introduced at a different step in the process than described hereinabove. It should also be understood that in certain embodiments, a single entity will conduct all of the above process steps, while in alternative embodiments, two or more entities will perform the above process steps.

It is believed, without being construed as limiting, that inclusion of phosphorus in the UZM-35 zeolite and/or in the first catalyst component stabilized the UZM-35 zeolite structure and/or the first catalyst component against steam treatment, which is believed to contribute to improved performance in hydrocarbon conversion processes generally, and in fluid catalytic cracking and/or hydrocracking applications in particular. Different zeolite structures behave differently under severe conditions, such as steam treatment, and hence, each zeolite would benefit from a customized stabilization techniques, if needed. For certain zeolite structures, such as zeolite Y, rare earth cations may be used for structure stabilization. A stabilization technique that may work for one zeolite structure may not necessarily work for a different zeolite structure. Notwithstanding the above, it was surprisingly identified herein, that phosphorus may be used for structure stabilization of a UZM-35 zeolite.

Catalyst Composition

In certain embodiments, the instant disclosure is directed to a catalyst composition that includes any of the first catalyst components described herein along with a second catalyst component and optionally with at least one additional component. The second catalyst composition being compositionally different from the first catalyst component. Any additional component that may be present may also be compositionally different from the first catalyst component and from the second catalyst component.

The second catalyst component may include a second zeolite and a second non-zeolitic matrix. Each at least one additional component may include a respective one additional non-zeolitic matrix. In certain embodiments, the at least one additional component includes at least one additional zeolite.

The second zeolite and/or the at least one additional zeolite may be independently selected from zeolites with the structure BEA (e.g., beta zeolite), MSE (e.g., MCM-68), -SVR, FAU (e.g., zeolite Y), MOR, CON, SOF, MFI (e.g., ZSM-5), IMF, FER, MWW, MTT, TON, EUO, MRE, NAT, CHA, TUN, YFI, or a combination thereof. In certain embodiments, the second zeolite and/or at least one additional zeolites may be independently selected from, without limitations, (1) large pore zeolites (e.g., those having pore openings greater than about 7 Angstroms) such as, for example, USY, REY, silicoaluminophosphates SAPO-5, SAPO-37, SAPO-40, MCM-9, metalloaluminophosphate MAPO-36, aluminophosphate VPI-5, or mesoporous crystalline material MCM-41; REUSY, zeolite X, zeolite Y, de-aluminated zeolite Y, silica-enriched de-aluminated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, UZM-35, ZSM-11, ZSM-11 intermediates, ZSM-12, ZSM-22, ZSM-23, ZSM-35, ZSM-38, ZSM-48, ZSM-57 silicoaluminophosphate SAPO-31 and (3) small pore zeolites (e.g., those having pore openings of less than about 4 Angstroms) such as, for example, erionite and ZSM-34. In certain embodiments, the second zeolite and/or the at least one additional zeolites may be independently selected from, without limitations, zeolite A, zeolite B, zeolite F, zeolite H, zeolite K-G, zeolite L, zeolite M, zeolite Q, zeolite R, zeolite T, mordenite, erionite, offretite, ferrierite, chabazite, clinoptilolite, gmelinite, phillipsite, faujasite, and a combination thereof.

Hydrothermally and/or chemically modified versions of many of the zeolites described above may also be suitably used in the second catalyst component and/or in the at least one additional component (if present) in the catalyst compositions contemplated herein.

In one embodiment, the second zeolite in the second component and/or the at least one additional zeolite in the at least one additional component (if present) includes large pore molecular sieve zeolite having a pore size greater than 7 angstroms. In one embodiment, the second zeolite in the second component and/or the at least one additional zeolite in the at least one additional component (if present) includes zeolite Y. In one embodiment, the second zeolite in the second component and/or the at least one additional zeolite in the at least one additional component (if present) includes ZSM-5, beta zeolite, or a combination thereof. In one embodiment, the second zeolite in the second component is Y zeolite, and the at least one additional zeolite in the at least one additional component (if present) is ZSM-5, beta zeolite, or a combination thereof. In one embodiment, the second zeolite in the second component is a combination of Y zeolite with at least one of ZSM-5 and beta zeolite.

The second non-zeolitic matrix and/or at least one additional non-zeolitic matrix in the at least one additional component (if present) may independently include one or more of clay, spinel, mullite, boehmite, alumina, silica, titania, zirconia, magnesia, kaolin, metakaolin, halloysite, kaolinite, dickite, nacrite, anauxite, silica-alumina, silica-magnesia, silica-zirconia, silica-thoria, silica-beryllia, silica-titania, silica-alumina-thoria, silica-alumina-zirconia, silica-alumina-magnesia, silica-magnesia-zirconia, rare earth-doped alumina (e.g., selected from one or more of ytterbium-doped alumina, gadolinium-doped alumina, cerium-doped alumina, or lanthanum-doped alumina), silica-doped alumina, gamma-alumina, $\alpha$-alumina, $\chi$-alumina, $\delta$-alumina, $\theta$-alumina, $\chi$-alumina, or a mixture thereof.

Any of the first catalyst components described herein may be present in any of the catalyst compositions contemplated herein in an amount ranging from any of about 1 wt %, about 1.5 wt %, about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, or about 9.5 wt % to any of about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt %, or any sub-range or single concentration value therein, based on total weight of the catalyst composition. In one embodiment, the first catalyst composition is present in the catalyst composition in an amount ranging from about 1 wt % to about 25 wt %, based on the total weight of the catalyst composition. In one embodiment, the first catalyst composition is present in the catalyst composition in an amount ranging from about 1.5 wt % to about 15 wt %, based on the total weight of the catalyst composition. In one embodiment, the first catalyst composition is present in the catalyst composition in an amount ranging from about 2 wt % to about 10 wt %, based on the total weight of the catalyst composition.

The second catalyst component and/or any additional component, cumulatively, are present in the catalyst composition in an amount that, together with the concentration of the first catalyst component, will add up to a 100 wt %.

In certain embodiments, the second catalyst component includes a large pore molecular sieve zeolite having a pore size greater than 7 Angstroms (such as, without limitations, zeolite Y, dealuminated zeolite Y, silica-enriched dealuminated zeolite Y, REY, USY, CREY, REUSY, and the like) that is present in the catalyst composition in an amount ranging from any of about 40 wt %, about 45 wt %, about 50 wt %, about 55 wt %, about 60 wt %, about 65 wt %, about 70 wt %, about 75 wt %, or about 80 wt % to any of about 85 wt %, about 90 wt %, about 91 wt %, about 92 wt %, about 93 wt %, about 94 wt %, about 95 wt %, or about 96 wt %, or any sub-range or single value therein, based on total weight of the catalyst composition.

In certain embodiments, the at least one additional component is present in the catalyst composition in an amount ranging from any of about 0.5 wt %, about 1 wt %, about 1.5 wt %, about 2 wt %, about 2.5 wt %, or about 3 wt % to any of about 4 wt %, about 5 wt %, about 6 wt %, about 7 wt %, about 8 wt %, about 9 wt %, about 10 wt %, or about 15 wt %, or any sub-range or single value therein, based on total weight of the catalyst composition.

In certain embodiments, the amount of the first catalyst component in the catalyst composition is lower than the amount of the second catalyst component. For instance, the wt:wt ratio of the first catalyst component (including the P modified UZM-35 zeolite) to the second catalyst component in the FCC catalyst composition may range from about 1:1.5 to about 1:20, from about 1:3 to about 1:15, or from about 1:5 to about 1:13, or any sub-range or single ratio value therein.

In certain embodiments, the instant disclosure is directed to a method for preparing any of the catalyst compositions described herein by combining any of the first catalyst components described herein with a second catalyst component and optionally with at least one additional component, if present. The process may further include preparing each of the components in the catalyst composition, such as, preparing the first catalyst component and/or preparing the second catalyst component and/or preparing any additional component that may be present in the composition.

In certain embodiments, the various components may be formulated as separate and distinct particles. In this manner, the first catalyst component may be add to the FCC catalyst composition as needed to provide a customized catalyst solution with customized performance. The catalyst composition may be designed to exhibit enhanced performance, such as improved total butylenes yield, improved butylenes to propylene selectivity ratio, enhanced catalytic stability (e.g., stability of the zeolite structures in the catalyst components and/or catalyst composition), and the like.

Methods of Use

In certain embodiments, the instant disclosure is directed to the use of any of the phosphorus modified UZM-35 zeolites described herein and/or to the use of any of the first catalyst components described herein and/or to the use of any of the catalyst compositions described herein in petroleum refining applications, such as hydrocarbon conversion processes generally and fluid catalytic cracking and/or hydrocracking particularly.

In certain embodiments, suitable hydrocarbon conversion processes may be selected from catalytic cracking, hydrocracking, alkylation of aromatic and/or isoparaffin, isomerization of paraffin and poly-alkylbenzenes, trans-alkylation of poly-alkylbenzene with benzene or mono-alkylbenzenes, disproportionation of mono-alkylbenzenes, polymerization, reforming, hydrogenation, dehydrogenation, transalkylation, dealkylation, hydration, dehydration, hydrotreating, hydrodenitrogenation, hydrodesulfurization, methanation, syngas shift process, hydrorefining, or a combination thereof.

All of these processes include contacting a hydrocarbon feedstock with any of the phosphorus modified UZM-35 zeolites described herein and/or any of the first catalyst components described herein and/or any of the catalyst compositions described herein.

Fluid catalytic cracking (FCC) is one type of catalytic cracking process that is widely used. The process typically employs a powdered catalyst having the particles suspended in a rising flow of feed hydrocarbons to form a fluidized bed. Zeolite-based catalysts are commonly used as are composite catalysts which contain zeolites, silica-aluminas, alumina and other binders. In representative processes, cracking takes place in a riser, which is a vertical or upward sloped pipe.

A pre-heated feed (e.g., a vacuum gas oil) may be sprayed into the base of the riser via feed nozzles where it contacts hot fluidized catalyst at a temperature between about 400° C. and about 800° C. The feed is vaporized on contact with the catalyst and the cracking occurs converting the high molecular weight oil into lighter components including liquefied petroleum gas (LPG), gasoline, and a distillate. The catalyst-feed mixture flows upward through the riser for a short period (few seconds) and then the mixture is separated in cyclones. The hydrocarbons thus separated from the catalyst are directed to a fractionator for separation into LPG, gasoline, diesel, kerosene, jet fuel, and other possible fractions.

While going through the riser, the cracking catalyst is deactivated because the process is accompanied by formation of deposit coke on the catalyst particles. So contaminated catalyst is separated from the cracked hydrocarbon vapors and is further treated with steam to remove hydrocarbons remaining in the catalyst's pores. The catalyst is then directed into a regenerator where the coke is burned off the catalyst particles surface, thus restoring the catalyst's activity and providing the necessary heat for the next reaction cycle. The process of cracking is endothermic. The regenerated catalyst is then used in the new cycle. New catalysts for catalytic cracking processes such as FCC should therefore be capable of regeneration. The UZM-35 zeolite and first catalyst component, in one embodiment, is stable with regard to regeneration.

Catalytic cracking processes may be carried out with the first catalyst component and/or catalyst composition described herein using feedstocks such as gas oils, heavy naphtha, cycle oils, deasphalted crude oil residua, Fischer-Tropsch wax, slack wax, hydrotreated products of the foregoing and combinations thereof, with gasoline being the typically desired product. Temperature conditions of from about 400° C. to about 800° C., pressure conditions of from about 0 to about 688 kPa g (about 0 to 100 psig) and contact times of from about 0.1 seconds to about 1 hour are suitable. Temperature conditions of from about 450° C. to about 700°

C., pressure conditions of from about 0 to about 344 kPa·g (about 0 to 50 psig) and contact times of from about 0.1 seconds to about several minutes are often preferred. The preferred conditions are determined based on the hydrocarbon feedstock being cracked and the cracked products desired.

Naphtha cracking processes may be carried out with the first catalyst component and/or catalyst composition described herein using a naphtha feedstock, such as, but not limited to, straight-run naphtha, Coker naphtha, Visbreaker naphtha, FCC naphtha, and Catalytic Polymerization naphtha (Cat Poly naphtha) which are catalytically cracked to light olefins such as ethylene and propylene. The naphtha is contacted with the first catalyst component in, for example, a fluidized catalytic cracking (FCC) type reactor. The choice of reactor can be any type of reactor for intimately mixing the naphtha feedstream with the catalyst. Reactors of this type are well known to those skilled in the art.

Alternatively, reactor types such as moving bed reactors with continuous catalyst regeneration, or fixed bed reactors with periodic catalyst regeneration by pressure swing or temperature swing may be utilized to contact the hydrocarbon feed with the first catalyst component. New catalysts for catalytic cracking processes such as naphtha cracking should therefore be capable of regeneration. The UZM-35 zeolite and first catalyst component, in one embodiment, is stable with regard to regeneration.

The naphtha cracking reactions can be carried out between a temperature of about 400° C. to about 700° C. The cracking process may be carried out using pressure conditions of from about 0 to about 688 kPa·g (about 0 to 100 psig) and a contact time from about 0.1 seconds to about 1 hour and preferably from about 0.1 seconds to about 0.1 hour. The longer contact times are used at lower temperatures while shorter times are used at higher temperatures, assuming all other process variables are equal.

Olefin cracking processes are preferably carried out with the first catalyst component and/or catalyst composition using feedstocks such as a mixed olefin stream comprising $C_4$ or $C_5$ to $C_{10}$ olefins, with ethylene, propylene, and butylene being the principal desired products. The operation of an olefin cracking reactor is at a temperature from 400° C. to 650° C., and preferably between 500° C. to 600° C. The pressure for the olefin cracking reactor during operation is between 0 kPa to 344 kPa, with a preferred operating pressure between 10 kPa to 200 kPa for the olefin partial pressure. The contact time for the olefin cracking process is from about 0.1 seconds to about 1 hour.

The $C_4$ or $C_5$ to $C_{10}$ olefin feedstock is passed over a first catalyst component and/or catalyst composition to crack the olefins into smaller molecules. The cracking process generates some coking on the catalyst component and/or catalyst composition, and over time the catalyst activity is reduced due to plugging of the catalyst pores with coke. The catalyst component and/or catalyst composition may be regenerated though oxidizing the coke and removing it as gas comprising primarily $N_2$, $H_2O$, CO and $CO_2$. The catalyst in the reactors may be regenerated periodically, and therefore the process may swing between multiple reactors on a frequent basis. Alternatively, reactor types such as moving or fluidized bed reactors with continuous catalyst regeneration may be utilized to contact the hydrocarbon feed with the first catalyst component and/or catalyst composition. New catalysts for catalytic cracking processes such as olefin cracking should therefore be capable of regeneration. The first catalyst component and/or catalyst composition described herein, in one embodiment, are stable with regard to regeneration.

In certain embodiments, the instant disclosure encompasses a process for catalytic cracking and/or hydrocracking of a hydrocarbon feedstock by contacting the feedstock with any of the phosphorus modified UZM-35 zeolites described herein and/or any of the first catalyst components described herein and/or any of the catalyst compositions described herein. In one embodiment, the instant disclosure is directed to a process for catalytic cracking and/or hydrocracking of a hydrocarbon feedstock by contacting the feedstock with a first catalyst component that includes a phosphorus modified UZM-35 zeolite and a first non-zeolitic matrix. The first catalytic component may have any of the characteristics described hereinbefore with respect to, without limitations, phosphorus content, XRD pattern, total acidity, SAR, micropore volume, surface area, or a combination thereof. In one embodiment, the instant disclosure is directed to a process for catalytic cracking and/or hydrocracking of a hydrocarbon feedstock by contacting the feedstock with any of the catalyst compositions described herein (which include any of the first catalyst components described herein, a second catalyst component, and optionally at least one additional component). The catalyst composition and its constituents may have any of the characteristics described hereinabove with respect to, without limitations, concentration of the various constituents, composition of the various constituents, or a combination thereof.

In certain embodiments, the phosphorus modified UZM-35 zeolites described herein and/or the first catalyst components described herein and/or the catalyst compositions described herein have higher selectivity towards butylenes and/or higher total butylenes yield compared to, e.g., ZSM-5, which is a commonly used zeolite for cracking towards small olefins.

In one embodiment, contacting any of the phosphorus modified UZM-35 zeolites described herein and/or a first catalyst component as described herein and/or a catalyst composition as described herein with a hydrocarbon feedstock under FCC conditions exhibits a first butylenes to propylene selectivity ratio, while contacting the same hydrocarbon feedstock under the same FCC conditions with a catalyst component comprising ZSM-5 and no phosphorus modified UZM-35 exhibits a second butylenes to propylene selectivity that is lower than the first butylenes to propylene selectivity ratio.

In one embodiment, contacting any of the phosphorus modified UZM-35 zeolites described herein and/or a first catalyst component as described herein and/or a catalyst composition as described herein with a hydrocarbon feedstock under FCC conditions exhibits a first butylenes to propylene selectivity ratio, while contacting the same hydrocarbon feedstock under the same FCC conditions with a catalyst component comprising UZM-35 without phosphorus modification exhibits a second butylenes to propylene selectivity that is substantially similar or lower than the first butylenes to propylene selectivity ratio.

In certain embodiments, the methods of cracking a hydrocarbon feed, as described herein, result in an average butylenes to propylene selectivity ratio that is greater than about 0.7, greater than about 0.8, greater than about 0.85, greater than about 0.9, or greater than about 0.95, or greater than about 1. In one embodiment, the method of cracking a hydrocarbon feed, as described herein, results in an average butylene to propylene selectivity ratio that is greater than about 0.7. In one embodiment, the method of cracking a hydrocarbon feed, as described herein, results in an average butylenes to propylene selectivity ratio that is greater than about 0.8. In one embodiment, the method of cracking a hydrocarbon feed, as described herein, results in an average butylenes to propylene selectivity ratio that is greater than about 0.85. In one embodiment, the method of cracking a hydrocarbon feed, as described herein, results in an average butylenes to propylene selectivity ratio that is greater than about 0.9. In one embodiment, the method of cracking a hydrocarbon feed, as described herein, results in an average butylenes to propylene selectivity ratio that is greater than about 0.95. In one embodiment, the method of cracking a hydrocarbon feed, as described herein, results in an average butylenes to propylene selectivity ratio that is greater than about 1.

In one embodiment, contacting any of the phosphorus modified UZM-35 zeolites described herein and/or a first catalyst component as described herein and/or a catalyst composition as described herein with a hydrocarbon feedstock under FCC conditions exhibits a first total butylenes yield (at a given conversion value), while contacting the same hydrocarbon feedstock under the same FCC conditions with a catalyst component comprising UZM-35 without phosphorus modification exhibits a second total butylenes yield (at the same conversion value) that is substantially similar or lower than the first total butylenes yield.

In certain embodiments, the first catalyst components described herein and/or the catalyst compositions described herein exhibit enhanced performance with respect to favorable products, such as butylenes, while suppressing selectivity toward less favorable products, such as, one or more of, benzene, toluene, xylene (BTX), methane, ethane, C6, and C7.

In certain embodiments, the instant disclosure is directed to a process for stabilizing the catalytic activity (after steaming) of a catalyst component including UZM-35 zeolite by modifying the UZM-35 zeolite with a phosphorus containing compound. Preservation of the catalytic activity after steaming may be assessed by comparing before steaming and after steaming values for one or more parameters such as, without limitations, total butylenes yield at a certain conversion value, the butylenes to propylene selectivity ratio, SAR, zeolite surface area, micropore volume, total acidity, or a combination thereof. In certain embodiments, any of the above parameters remain substantially similar for the first catalyst components described herein and/or for the catalyst compositions described herein before steaming and after steaming. Furthermore, in certain embodiments, any of the above parameters remain substantially similar for the first catalyst components described herein (whether before steaming or after steaming) as compared to the first catalyst component without phosphorus stabilization/modification, before and/or after steaming. Exemplary steaming conditions include steam treating at 816° C. for about 4 hours at a flow rate of about 0.2 ml/min to about 1 ml/min (e.g., 0.4 ml/min). In some embodiments, the steaming is conducted for about one to about 24 hours. The steaming temperature and duration should not be construed as limiting. Under various circumstances, other steaming durations and temperatures may be utilized.

The term "substantially similar," as used herein, refers to a particular value being within about 5%, within about 10%, or within about 15% of the value that it is being compared to.

ILLUSTRATIVE EXAMPLES

The following examples are set forth to assist in understanding the disclosure and should not be construed as specifically limiting the invention described and claimed herein. Such variations of the invention, including the substitution of all equivalents now known or later developed, which would be within the purview of those skilled in the art, and changes in formulation or minor changes in experimental design, are to be considered to fall within the scope of the invention incorporated herein.

Example 1: Synthesis of UZM-35

UZM-35 was synthesized according to the processes described in J. H. Lee et al., Applied Catalysis B: Environmental 200 (2017) 428-438, and U.S. Pat. No. 7,922,997, the teachings of which are incorporated by reference in their entirety and further detailed, at least in part, below.

An aluminosilicate solution was prepared by mixing a Si source with a solution of Al source and dimethyldipropylammonium hydroxide (DMDPAOH) in water. The Al source was one or more of aluminum hydroxide ($Al(OH)_3$), aluminum isopropoxide ($Al[OCH(CH_3)_2]_3$), aluminum metal, pseudoboehmite, aluminum nitrate ($Al(NO_3)_3 \cdot 9H_2O$). The Si source was one or more of colloidal silica, fumed silica, and tetraethylorthosilicate.

Then an aqueous solution of KOH and NaOH was added to the aluminosilicate solution. The final composition was $4.5 DMDPAOH/x\ K_2O/(1-x)\ Na_2O/y\ Al_2O_3/10\ SiO_2/150\ H_2O$, where x and y are varied between $0 \leq x \leq 1$ and $0 \leq y \leq 1$, respectively.

After being stirred at room temperature for a first duration (e.g., about 2 hours), the synthesis mixture (of Al source, Si source, DMDPAOH, KOH, and NaOH), was heated at a temperature (e.g., about 175° C.) for a second duration (e.g., about 7 days to about 14 days) under static conditions.

In one example, the Al source was aluminum hydroxide ($Al(OH)_3$), the Si source was colloidal silica, x was 0.75, and y was $0.26 \leq y \leq 1$, the mixture was heated at 175° C., under static conditions for about 6 days to about 14 days (e.g., 7 days). In one example, the final composition was 18 DMDPAOH/3 $K_2O$/1 $Na_2O$/2.4 $Al_2O_3$/40 $SiO_2$/600 $H_2O$.

Figure 1B:
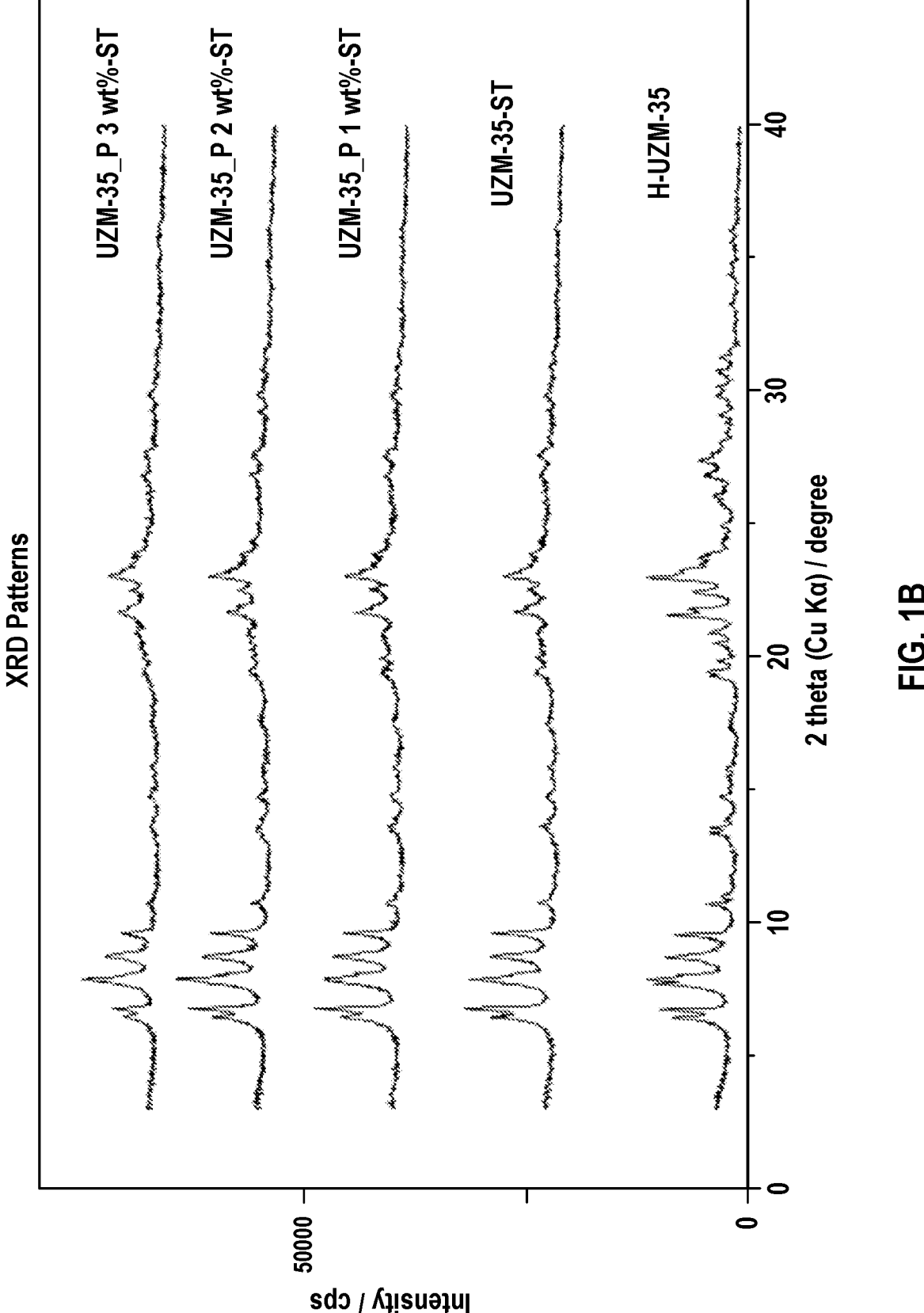
FIG. 1B illustrates the XRD patterns of various catalyst components including UZM-35 zeolite prior to steaming and without phosphorus modification, and UZM-35 zeolite after steaming and with various amounts of phosphorus modification.

The solid products were recovered by filtration or centrifugation, washed repeatedly (e.g., with distilled water), and dried (e.g., at about 120° C. for about 12 hours). The as-made UZM-35 was calcined in air at a calcination temperature (e.g., about 500° C. to about 700° C.) for a calcination duration (e.g., about 2 hours to about 8 hours) to remove the occluded structure directing agent (SDA) and to form "H-UZM-35" which exhibited an XRD pattern as shown in FIGS. 1A and 1B, prior to steaming, and an XRD pattern of "UZM-35-ST" as shown in FIG. 1B, after steaming under steaming conditions (e.g., steaming temperature of about 800° C.-850° C. for about 2 hours to about 24 hours at a $H_2O$ flow rate of about 0.4 mL/min). In certain embodiments, the synthesis process of UZM-35 zeolite may further include ion exchanging with, e.g., $NH_4+$ ions.

Example 2: Effect of Phosphorus Modification on MSE Structure of UZM-35

The UZM-35 zeolite from Example 1 was further modified with a phosphorus species by impregnating (e.g., performing incipient wetness impregnation) of the UZM-35 zeolite with an aqueous solution of diammonium phosphate (($NH_4)_2HPO_4$ aq. The diammonium phosphorus was added in an appropriate amount to achieve a UZM-35 zeolite impregnated with about 1 wt % phosphorus, about 2 wt % phosphorus, and about 3 wt % phosphorus, all wt % being based on the total weight of the UZM-35 zeolite. After impregnation, the phosphorus modified UZM-35 was dried (e.g., at about 120° C. for about 12 hours) and calcined (e.g., about 500° C. to about 700° C., or about 650° C.) for a calcination duration (e.g., about 2 hours to about 8 hours, or about 3 hours) in a muffle furnace, to form "UZM-35 P 1 wt %," "UZM-35 P 2 wt %," and "UZM-35 P 3 wt %" which exhibit an XRD pattern as shown in FIG. 1A, prior to steaming, and an XRD pattern as shown in FIG. 1B, after steaming under steaming conditions (e.g., steaming temperature of about 800° C.-850° C. (or about 816° C.) for about 2 hours to about 24 hours (or about 4 hours) at a $H_2O$ flow rate of about 0.4 mL/min).

As can be seen from comparing the various XRD patterns in FIGS. 1A and 1B, the MSE structure of the UZM-35 is retained after phosphorus modification and/or after steaming.

Example 3: Performance of UZM-35 Zeolite (with and without P Modification) in 1-Octene Cracking Reaction The performance of UZM-35 zeolite containing catalyst component with phosphorus modification, before and after steaming, was compared to that of UZM-35 zeolite containing catalyst component without phosphorus modification, in a cracking reaction of 1 octene. The reaction conditions were: 2.5 mg of a catalyst component, $P_{1-octene}$ was 33 kPa, temperature was 600° C., and $W/F_{1-Octene}$ was 0.07 g·h/mol. The steaming conditions were water flowing at a rate of 0.4 ml/min at 816° C. for 4 hours.

Figures 2A, 2B, 2C:
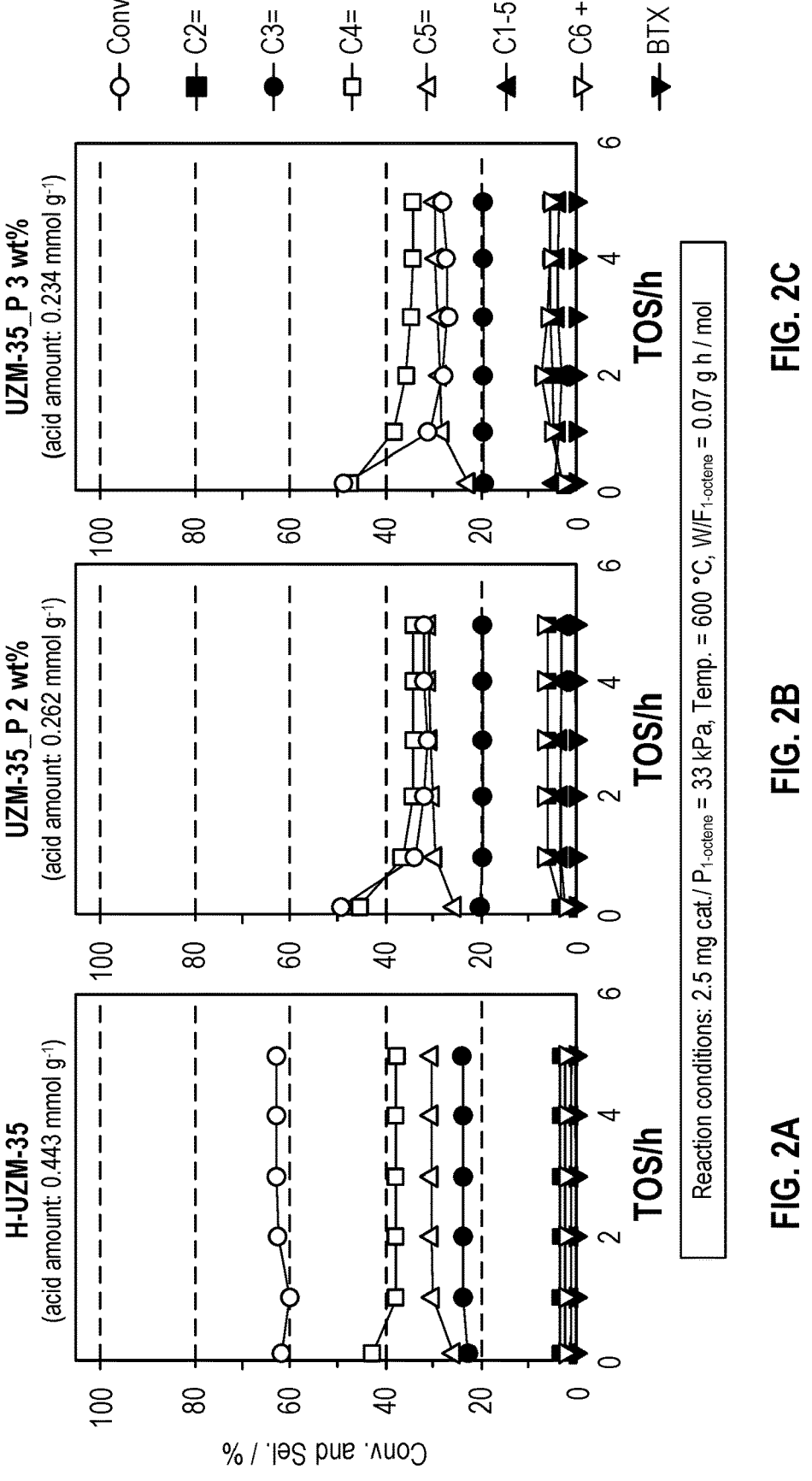
FIG. 2A depicts the performance of a catalyst component including UZM-35 zeolite prior to steaming and without phosphorus modification.
FIG. 2B depicts the performance of a catalyst component including UZM-35 zeolite prior to steaming and with 2 wt % phosphorus modification.
FIG. 2C depicts the performance of a catalyst component including UZM-35 zeolite prior to steaming and with 3 wt % phosphorus modification.

The following catalyst components were assessed: A) A catalyst component including UZM-35 zeolite (FIG. 2A, "H-UZM-35"), B) a catalyst component including UZM-35 after steaming at the above steaming conditions (FIG. 3A, "UZM-35_ST"), C) a catalyst component including UZM-35 modified with 2 wt % phosphorus before steaming (FIG. 2B, "UZM-35_P 2 wt %"), D) a catalyst component including UZM-35 modified with 2 wt % phosphorus after steaming at the above steaming conditions (FIG. 3B, "UZM-35_P 2 wt %-ST"), E) a catalyst component including UZM-35 modified with 3 wt % phosphorus before steaming (FIG. 2C, "UZM-35_P 3 wt %"), F) a catalyst component including UZM-35 modified with 3 wt % phosphorus after steaming at the above steaming conditions (FIG. 3C, "UZM-35 P 3 wt %-ST").

Figures 3A, 3B, 3C:
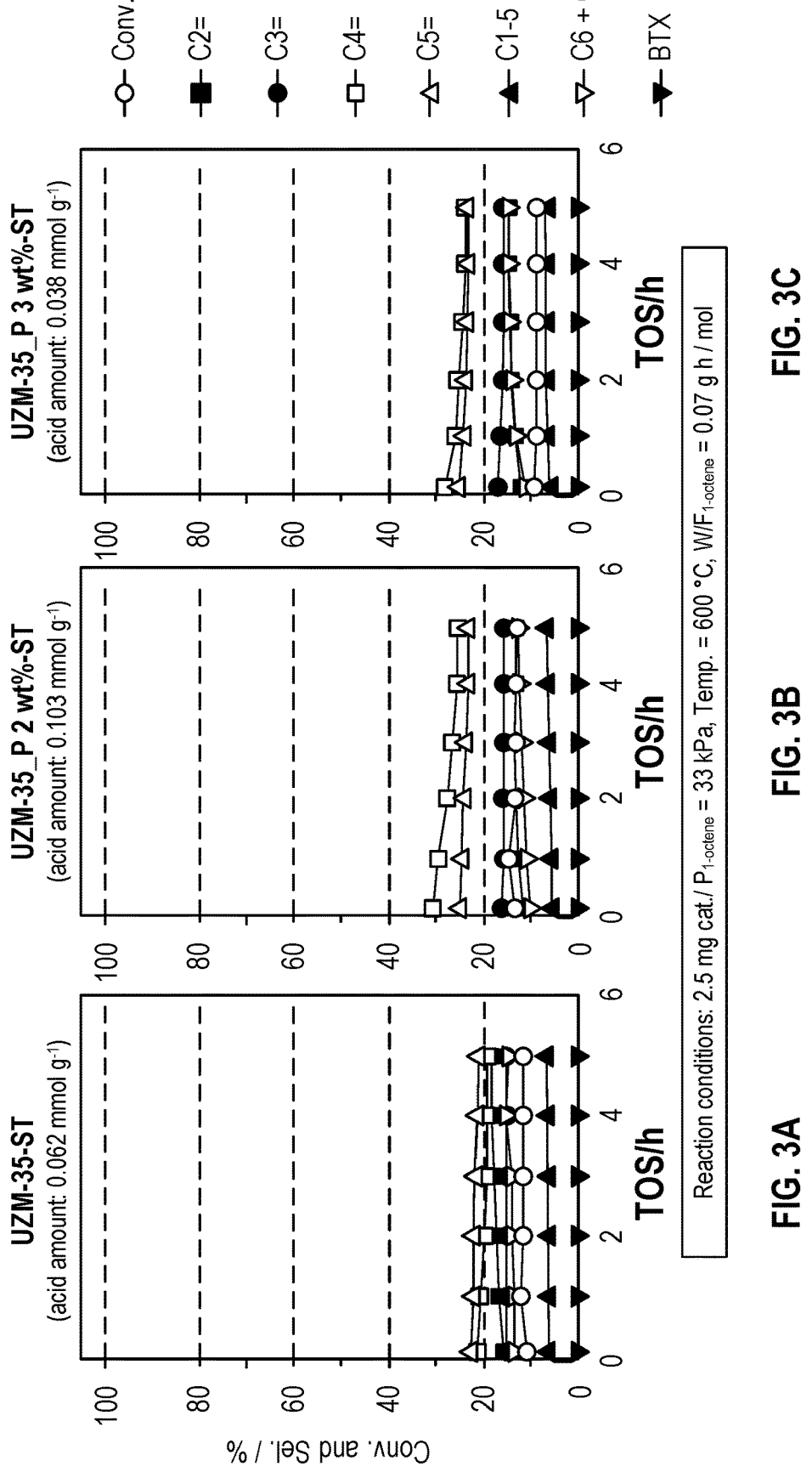
FIG. 3A depicts the performance of a catalyst component including UZM-35 zeolite after steaming and without phosphorus modification.
FIG. 3B depicts the performance of a catalyst component including UZM-35 zeolite after steaming and with 2 wt % phosphorus modification.
FIG. 3C depicts the performance of a catalyst component including UZM-35 zeolite after steaming and with 3 wt % phosphorus modification.

As can be seen in FIG. 3A, the conversion of 1-octene is about 10% for a catalyst component including UZM-35 after steaming and prior to P modification. In comparison, in FIG. 3C, the conversion is above 10% for a catalyst component including a phosphorus modified UZM-35 after steaming.

It is also evident, when comparing FIGS. 3A and 3B/3C, that the butylenes to propylene selectivity ratio of a catalyst component including phosphorus modified UZM-35 (after steaming) is greater than that of a catalyst component including UZM-35 (without phosphorus modification and after steaming), when compared at a given conversion.

Additionally, the catalyst component containing the phosphorus modified UZM-35 (FIGS. 3B and 3C) showed higher C4=selectivity with a slow deactivation.

The Table below further details the SAR values, P/Al molar ratios, number of acid sites, specific surface area, and micropore volume for each of the catalyst components that were illustrated in the figures.

| Sample | Si/Al Molar ratio | P/Al Molar ratio | Number of acid site Units mmol/g | Specific surface area m²/g | Micropore volume cc/g |
|---|---|---|---|---|---|
| H-UZM-35 | 7.9 | — | 0.443 | 376 | 0.14 |
| UZM-35_P 1 wt % | 7.9 | 0.16 | 0.287 | 357 | 0.13 |
| UZM-35_P 2 wt % | 7.9 | 0.35 | 0.262 | 306 | 0.12 |
| UZM-35_P 3 wt % | 8.0 | 0.55 | 0.234 | 252 | 0.086 |
| UZM-35-ST | 7.8 | — | 0.062 | 94 | 0.041 |
| UZM-35_P 1 wt %-ST | 7.7 | 0.16 | 0.081 | 136 | 0.057 |
| UZM-35_P 2 wt % ST | 7.8 | 0.36 | 0.103 | 169 | 0.071 |
| UZM-35_P 3 wt %-ST | 7.8 | 0.53 | 0.038 | 149 | 0.055 |

The results in the above table suggest that there may be a preferred phosphorus content range that provides for improved catalytic performance. As seen in the Table above and in the accompanying figures, 2 wt % phosphorus content illustrated improved hydrothermal stability for UZM-35, improved conversion after steaming, and improved C4=selectivity after steaming. The results in the above table also show that adding phosphorus to UZM-35 zeolite containing catalyst component appear to improve the amount of surface area and/or pore volume retained after steam deactivation.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

The present disclosure has been described with reference to specific exemplary embodiments thereof. The specification and drawings are, accordingly, to be regarded in an illustrative rather than a restrictive sense. Various modifications of the disclosure in addition to those shown and described herein will become apparent to those skilled in the art and are intended to fall within the scope of the appended claims.

What is claimed is:

1. A process for catalytic cracking of a hydrocarbon feedstock comprising contacting the feedstock with a first catalyst component comprising a phosphorus modified UZM-35 zeolite and a first non-zeolitic matrix;
   wherein the first catalyst component has a total acidity of about 0.1 mmol/(g catalyst component) to about 0.7 mmol/(g catalyst component).

2. The process of claim 1, wherein the first catalyst component comprises from about 0.5 wt % to about 10 wt % phosphorus, based on total weight of the phosphorus modified UZM-35 zeolite in the first catalyst component.

3. The process of claim 1, wherein the first catalyst component has a total acidity of about 0.2 mmol/(g catalyst) to about 0.5 mmol/(g catalyst).

4. The process of claim 1, wherein the silicon to aluminum ratio of the phosphorus modified UZM-35 zeolite ranges from about 5 to about 60.

5. The process of claim 1, wherein a first butylenes to propylene selectivity ratio, attained from contacting the feedstock with the first catalyst component, is greater than a second butylenes to propylene selectivity ratio, attained from contacting the feedstock with a catalyst component comprising a beta zeolite and/or a ZSM-5 zeolite without phosphorus modified UZM-35 zeolite.

6. The process of claim 1, wherein the first catalyst component is part of a catalyst composition, and wherein the first catalyst component is present in the catalyst composition in an amount ranging from about 1 wt % to about 25 wt %, based on total weight of the catalyst composition.

7. The process of claim 6, wherein the catalyst composition further comprises a second catalyst component.

8. The process of claim 7, wherein the catalyst composition further comprises at least one additional component that is compositionally different from the second catalyst component and from the first catalyst component.

9. The process of claim 8, wherein the at least one additional component comprises beta zeolite and/or ZSM-5 zeolite and at least one additional non-zeolitic matrix.

10. The process of claim 1, wherein catalytic cracking comprises fluid catalytic cracking or hydrocracking.

11. A catalyst component comprising:
    phosphorus modified UZM-35 zeolite having from about 0.5 wt % to about 10 wt % phosphorus, based on total weight of the phosphorus modified UZM-35 zeolite in the catalyst component; and a non-zeolitic matrix;
    wherein the catalyst component has a total acidity of about 0.2 mmol/(g catalyst component) to about 0.5 mmol/(g catalyst component).

12. The catalyst component of claim 11, comprising from about 1 wt % to about 5 wt % phosphorus, based on total weight of the phosphorus modified UZM-35 zeolite in the catalyst component.

13. The catalyst component of claim 11, wherein the non-zeolitic matrix comprise one or more of clay, spinel, mullite, boehmite, alumina, silica, titania, zirconia, magnesia, kaolin, metakaolin, halloysite, kaolinite, dickite, nacrite, anauxite, silica-alumina, silica-magnesia, silica-zirconia, silica-thoria, silica-beryllia, silica-titania, silica-alumina-thoria, silica-alumina-zirconia, silica-alumina-magnesia, silica-magnesia-zirconia, rare earth-doped alumina (e.g., selected from one or more of ytterbium-doped alumina, gadolinium-doped alumina, cerium-doped alumina, or lanthanum-doped alumina), silica-doped alumina, gamma-alumina, $\alpha$-alumina, $\chi$-alumina, $\delta$-alumina, $\theta$-alumina, $\kappa$-alumina, or a mixture thereof.

14. The catalyst component of claim 11, wherein the phosphorus modified UZM-35 zeolite is present in the catalyst component from about 1 wt % to about 90 wt %, based on total weight of the catalyst component.

15. The catalyst component of claim 11, wherein the silicon to aluminum ratio of the phosphorus modified UZM-35 zeolite ranges from about 5 to about 60.

16. A catalyst composition comprising:

a first catalyst component comprising:

a phosphorus modified UZM-35 zeolite having from about 0.5 wt % to about 10 wt % phosphorus, based on total weight of the phosphorus modified UZM-35 zeolite in the first catalyst component; and a first non-zeolitic matrix; and a second catalyst component comprising a second zeolite and a second non-zeolitic matrix;

wherein the first catalyst component is present in the catalyst composition in an amount ranging from about 1 wt % to about 25 wt %, and wherein the second zeolite is selected from beta zeolite, ZSM-5 zeolite, a large pore molecular sieve zeolite having a pore size greater than 7 Angstroms, or a combination thereof.

17. A process of preparing the catalyst composition of claim 16, comprising combining the first catalyst component with the second catalyst component and optionally with at least one additional component.

18. A process for catalytic cracking of a hydrocarbon feedstock, the process comprising:

contacting the feedstock with a first catalyst component comprising a phosphorus modified UZM-35 zeolite and a first non-zeolitic matrix, wherein the first catalyst component is part of a catalyst composition and the first catalyst component is present in the catalyst composition in an amount ranging from about 1 wt % to about 25 wt % based on total weight of the catalyst composition, and wherein the catalyst composition further comprises a second catalyst component comprising at least one large pore molecular sieve zeolite having a pore size greater than 7 Angstroms.

19. The process of claim 18, wherein the at least one large pore molecular sieve zeolite is zeolite Y.

* * * * *